UNITED STATES PATENT OFFICE.

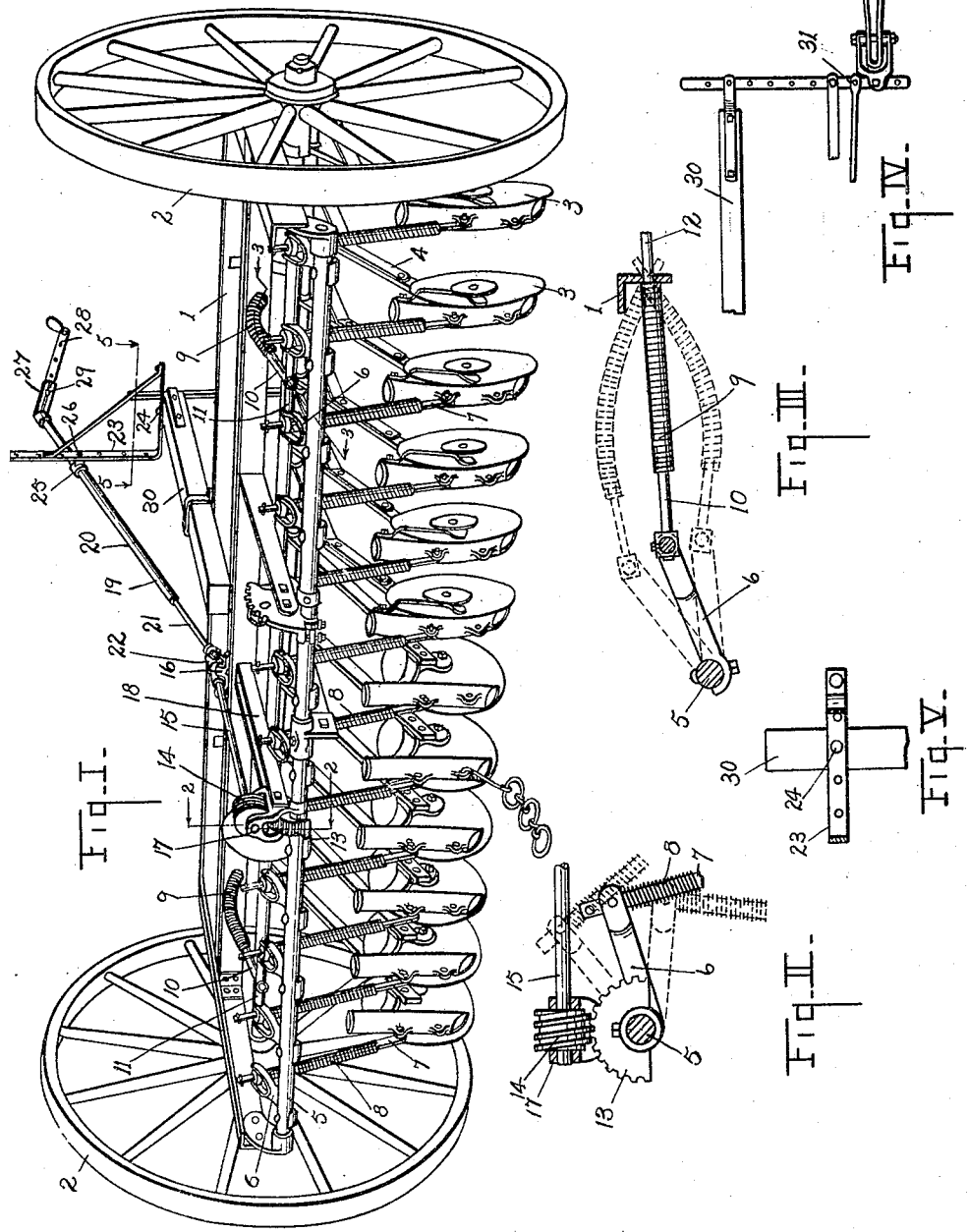

CHARLES L. FOWLE AND WILMONT BILLS, OF DOWAGIAC, MICHIGAN, ASSIGNORS TO DOWAGIAC DRILL COMPANY, OF DOWAGIAC, MICHIGAN.

GRAIN DRILL.

1,413,845.

Specification of Letters Patent. Patented Apr. 25, 1922.

Application filed July 12, 1918. Serial No. 244,532.

*To all whom it may concern:*

Be it known that we, CHARLES L. FOWLE and WILMONT BILLS, citizens of the United States, residing at Dowagiac, county of Cass, State of Michigan, have invented certain new and useful Improvements in Grain Drills, of which the following is a specification.

This invention relates to improvements in grain drills.

The main object of this invention is to provide an improved grain drill which is adapted to be drawn by a tractor and conveniently operated by the driver of the tractor.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this specification, in which:

Fig. I is a rear perspective view of a grain drill of the disk type embodying the features of our invention, the grain box and feed mechanism and a portion of the covering chains being omitted.

Fig. II is an enlarged detail view on a line corresponding to line 2—2 of Fig. I.

Fig. III is an enlarged detail view on a line corresponding to the broken line 3—3 of Fig. I, showing the arrangement of the auxiliary lift and pressure spring for the furrow openers.

Fig. IV is a detail side elevation of the pole draft connection.

Fig. V is a horizontal section on a line corresponding to line 5—5 of Fig. I.

In the drawing similar reference characters refer to similar parts throughout the several views, and the sectional views are taken looking in the direction of the little arrows at the ends of the section lines.

Referring to the drawing, 1 represents the main frame and 2 the carrying wheels. The furrow openers 3 are of the disk type and are connected to the frame by the draw bars 4. The furrow opener adjusting rock shaft 5 is provided with forwardly projecting forked arms 6 to which the furrow openers are connected by the links 7. Pressure springs 8 are provided on the links 7.

An additional pressure and lifting means is provided consisting of the springs 9, the rear ends of which are connected by the rods 10 to the cross pieces 11 carried by pairs of the arms 6, the forward ends of the springs being connected to the frame by the rods 12. The operation of these springs is illustrated in Fig. III. The parts described are shown more or less conventionally and they are not described in further detail as the arrangement thereof is old.

On the furrow opener adjusting rock shaft 5 we mount a worm segment 13 and above this a coacting worm 14. The worm 14 is provided with a shaft 15 supported at its front end by a bearing 16 and mounted on the frame at its rear end by a bracket 17. This bracket 17 is braced and supported by the bars 18 extending from the bracket to the frame.

We provide an actuating shaft 19 consisting of telescoping sections 20 and 21, the section 21 being connected to the shaft 15 by a universal joint 22. This actuating shaft 19 is adjustably supported by an L-shaped bracket 23 both arms of which are provided with a plurality of bolt holes. The horizontal arm rests upon and is adjustably secured to the tongue 30 by means of the bolt 24, while the bearing 25 for the actuating shaft is adjustably secured to the vertical arm of the bracket by means of the bolt 26 which may be engaged in any one of the several holes.

The actuating shaft is provided with a crank 27 having an adjustable handpiece section 28 secured by the bolt 29 so that the crank may be adjusted to regulate the length of its throw. The supporting bracket may be reversed on the stub tongue 30 if desired. By providing an actuating shaft which may be conveniently lengthened or shortened and an adjustable support therefor the parts may be adjusted to bring the crank into convenient operating relation to the seat of a tractor, the position of which is found to vary in the different tractors on the market.

A draft connection, designated generally by the numeral 31, is provided for the tractor. However, these details form no part of our present invention.

We have illustrated and described our improvements in one practical embodiment thereof. We have not attempted to illustrate or describe other adaptations or embodiments which we contemplate as we believe the disclosure made will enable those skilled in the art to which our invention relates to embody or adapt the same as may be desired.

Having thus described our invention what we claim as new and desire to secure by Letters Patent, is:

1. The combination in a grain drill of the class comprising carrying wheels, a main frame, a tongue, draft connections, and furrow openers, of adjusting means for said furrow openings comprising a forwardly extending actuating shaft having sections telescoping for longitudinal adjustment, a crank for said actuating shaft provided with a handpiece section adjustable to vary the length of the crank, an L-shaped supporting bracket having a plurality of bolt holes in each arm mounted on said tongue by a bolt on the tongue engaging a hole of the horizontal arm of the bracket so that the same may be reversed or adjusted laterally on the tongue, and a bearing for said actuating shaft secured to the bracket by a bolt engaging a hole of the vertical arm so that the shaft may be vertically adjusted.

2. The combination in a grain drill of the class comprising carrying wheels, a main frame, a tongue, draft connections, and furrow openers, of adjusting means for said furrow openers comprising a forwardly extending actuating shaft, an L-shaped supporting bracket having a plurality of bolt holes in each arm mounted on said tongue by a bolt on the tongue engaging a hole of the horizontal arm of the bracket so that the same may be reversed or adjusted laterally on the tongue, and a bearing for said actuating shaft secured to the bracket by a bolt engaging a hole of the vertical arm so that the shaft may be vertically adjusted.

3. The combination in a grain drill of the class comprising carrying wheels, a main frame, a tongue, draft connections, and furrow openers, of a rock shaft for adjusting said furrow openers, a worm segment on said rock shaft, a worm coacting with said segment, a forwardly extending actuating shaft for said worm and comprising sections telescoping for longitudinal adjustment, a crank for said actuating shaft provided with a handpiece section adjustable to vary the length of the crank, an L-shaped supporting bracket adjustably and reversibly mounted on said tongue, and a bearing for said actuating shaft adjustably mounted on said bracket.

4. The combination in a grain drill of the class comprising carrying wheels, a main frame, a tongue, draft connections, and furrow openers, of a rock shaft for adjusting said furrow openers, a worm segment on said rock shaft, a worm coacting with said segment, a forwardly extending actuating shaft for said worm, an L-shaped supporting bracket adjustably and reversibly mounted on said tongue, and a bearing for said actuating shaft adjustably mounted on said bracket.

5. The combination in a grain drill of the class comprising carrying wheels, a main frame, a tongue, draft connections, and furrow openers, of a rock shaft for adjusting said furrow openers, a worm segment on said rock shaft, a worm coacting with said segment, a forwardly extending actuating shaft for said worm and comprising sections telescoping for longitudinal adjustment, an L-shaped supporting bracket adjustably and reversibly mounted on said tongue, and a bearing for said actuating shaft adjustably mounted on said bracket.

6. The combination in a grain drill of the class comprising carrying wheels, a main frame, a tongue, draft connections, and furrow openers, of a rock shaft for adjusting said furrow openers, a worm segment on said rock shaft, a worm shaft mounted in bearings on said frame and provided with a worm coacting with said segment, a bracket adjustably supported on said tongue, and a forwardly extending actuating shaft having a universal joint connection to said worm shaft, the forward end thereof being adjustably supported on said bracket.

In witness whereof, we have hereunto set our hands and seals.

CHARLES L. FOWLE. [L. S.]
WILMONT BILLS. [L. S.]